(12) United States Patent
Hong et al.

(10) Patent No.: US 12,231,844 B2
(45) Date of Patent: Feb. 18, 2025

(54) MICROPHONE SYSTEM AND BEAMFORMING METHOD

(71) Applicant: British Cayman Islands Intelligo Technology Inc., Grand Cayman (KY)

(72) Inventors: Hua-Jun Hong, Zhubei (TW); Chih-Sheng Chen, Zhubei (TW); Hsueh-Ying Lai, Zhubei (TW); Yu-Pao Tsai, Zhubei (TW); Tsung-Liang Chen, Zhubei (TW)

(73) Assignee: BRITISH CAYMAN ISLANDS INTELLIGO TECHNOLOGY INC., Grand Cayman (KY)

( * ) Notice: Subject to any disclaimer, the term of this patent is extended or adjusted under 35 U.S.C. 154(b) by 188 days.

(21) Appl. No.: 17/895,980

(22) Filed: Aug. 25, 2022

(65) Prior Publication Data

US 2023/0276170 A1 Aug. 31, 2023

Related U.S. Application Data

(60) Provisional application No. 63/313,731, filed on Feb. 25, 2022.

(51) Int. Cl.
*H04R 1/40* (2006.01)
*G06N 3/04* (2023.01)
(Continued)

(52) U.S. Cl.
CPC ............ *H04R 1/406* (2013.01); *G06N 3/04* (2013.01); *G06N 3/08* (2013.01); *G10L 21/0224* (2013.01);
(Continued)

(58) Field of Classification Search
CPC .. H04R 1/406; H04R 3/005; H04R 2201/401; H04R 2410/01; H04R 2430/20;
(Continued)

(56) References Cited

U.S. PATENT DOCUMENTS 8,755,536 B2    6/2014  Chen et al.
9,972,339 B1 *  5/2018  Sundaram ............. G01S 3/8083
(Continued)

FOREIGN PATENT DOCUMENTS

CN   206711603 U  * 12/2017  ......... G10L 21/0208
CN   111373769 A    7/2020

OTHER PUBLICATIONS

Choi, Hyeong-Seok et al. "Phase-Aware Speech Enhancement with Deep Complex U-Net", Published as a conference paper at 2019 International Conference on Learning Representations (ICLR), pp. 1-20.
(Continued)

*Primary Examiner* — Ahmad F. Matar
*Assistant Examiner* — Sabrina Diaz
(74) *Attorney, Agent, or Firm* — Muncy, Geissler, Olds & Lowe, P.C.

(57) ABSTRACT

A microphone system of the invention is applicable to an electronic device comprising an adjustable mechanism that causes a change in geometry of a microphone array. The microphone system comprises the microphone array, a sensor and a beamformer. The microphone array comprises multiple microphones that detect sound and generate multiple audio signals. The sensor detects a mechanism variation of the electronic device to generate a sensing output. The beamformer is configured to perform a set of operations comprising: performing a spatial filtering operation over the multiple audio signals using a trained model based on the sensing output, one or more first sound sources in one or more desired directions and one or more second sound sources in one or more undesired directions to generate a beamformed output signal originated from the one or more first sound sources.

24 Claims, 8 Drawing Sheets

(51) Int. Cl.
*G06N 3/08* (2023.01)
*G10L 21/0224* (2013.01)
*H04R 3/00* (2006.01)
*G10L 21/0216* (2013.01)

(52) U.S. Cl.
CPC .... *H04R 3/005* (2013.01); *G10L 2021/02166* (2013.01); *H04R 2201/401* (2013.01); *H04R 2410/01* (2013.01); *H04R 2430/20* (2013.01)

(58) Field of Classification Search
CPC ........ G06N 3/04; G06N 3/08; G10L 21/0224; G10L 2021/02166
USPC ............................................. 381/92, 122, 91
See application file for complete search history.

(56) References Cited

U.S. PATENT DOCUMENTS

| | | | |
|---|---|---|---|
| 10,477,298 B2 * | 11/2019 | Cruz-Hernandez | G08B 6/00 |
| 11,665,460 B2 | 5/2023 | Igarashi et al. | |
| 2012/0182429 A1 | 7/2012 | Forutanpour et al. | |
| 2021/0373610 A1 * | 12/2021 | Xu | F16M 11/10 |
| 2022/0053281 A1 * | 2/2022 | Sheaffer | H04R 1/1008 |

OTHER PUBLICATIONS

U.S. Appl. No. 17/974,323, filed Oct. 26, 2022.

* cited by examiner

MICROPHONE SYSTEM AND BEAMFORMING METHOD

CROSS-REFERENCE TO RELATED APPLICATION

This application claims priority under 35 USC 119(e) to U.S. provisional application No. 63/313,731, filed on Feb. 25, 2022, the content of which is incorporated herein by reference in its entirety.

BACKGROUND OF THE INVENTION

Field of the Invention

The invention relates to audio processing, and more particularly, to a microphone system and a beamforming method.

Description of the Related Art

Beamforming techniques use the time differences between channels that results from the spatial diversity of the microphones to enhance the reception of signals from desired directions and to suppress the unwanted signals coming from other directions. Chen et al. disclosed a method for adjusting an aim of audio beamforming in U.S. Pat. No. 8,755,536B2. Forutanpour et al. disclosed a mobile platform capable of implementing beamforming in US Publication No. 2012/0182429. The above two disclosures have three common features as follows: (1) including a fixed geometry of the microphone array; (2) including an orientation sensor for detecting a change in the orientation of the microphone array or movement of the mobile platform; (3) adjusting the aim of the beamforming according to the output of the orientation sensor. In the above two disclosures, the fixed geometry of the microphone array is a prerequisite for successfully adjusting the aim of the beamforming. In this disclosure, the term "geometry of the microphone array" refers to a physical relationship in three-dimensional space among different microphones of the microphone array. However, in some electronic devices, such as laptops and headsets, the geometry of the microphone array may change from time to time due to the user adjustments to the device mechanism, and thus using only the orientation sensor is not sufficient to ensure a successful aim of the beamforming.

What is needed is a microphone system with a geometry-aware beamformer applicable to an electronic device with an adjustable mechanism and capable of keeping preserving/enhancing audio signals from a target sound source set (T) located in desired directions and suppressing audio signals from a cancel sound source set (C) located in undesired directions, regardless of how the device mechanism is adjusted or how the geometry of the microphone array is changed.

SUMMARY OF THE INVENTION

In view of the above-mentioned problems, an object of the invention is to provide a microphone system capable of keeping preserving/enhancing audio signals from a target sound source set located in desired directions and suppressing audio signals from a cancel sound source set located in undesired directions, regardless of how a geometry of a microphone array is changed.

One embodiment of the invention provides a microphone system applicable to an electronic device comprising an adjustable mechanism that causes a change in geometry of a microphone array. The microphone system comprises a microphone array, a sensor and a beamformer. The microphone array comprises multiple microphones that detect sound from all directions and generate multiple audio signals. The sensor detects a mechanism variation of the electronic device to generate a sensing output. The beamformer is configured to perform a set of operations comprising: performing a spatial filtering operation over the multiple audio signals using a trained model based on the sensing output, one or more first sound sources in one or more desired directions and one or more second sound sources in one or more undesired directions to generate a beamformed output signal originated from the one or more first sound sources.

Another embodiment of the invention provides a beamforming method, applicable to an electronic device comprising a microphone array, a sensor and an adjustable mechanism, the method comprising: detecting sound from all directions by multiple microphones in the microphone array to generate multiple audio signals; detecting a mechanism variation of the electronic device by the sensor to generate a sensing output, wherein the adjustable mechanism causes a change in geometry of the microphone array; and, performing a spatial filtering operation over the multiple audio signals using a trained model based on the sensing output, one or more first sound sources in one or more desired directions and one or more second sound sources in one or more undesired directions to generate a beamformed output signal originated from the one or more first sound sources.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components with the same function are designated with the same reference numerals.

A feature of the invention is to perform spatial filtering operations over multiple microphone signals from multiple microphones in a microphone array using a trained neural network according to a sensor output (representing a corresponding geometry of the microphone array), a target sound source set (T) located in desired directions and a cancel sound source set (C) located in undesired direction (will be defined below) for an electronic device with an adjustable mechanism to generate a filtered audio signal originated from the target sound source set (T). Another feature of the invention is to use the sensor output and locations of the multiple microphones disposed on the electronic device to calculate a current geometry of the microphone array. Another feature of the invention is that the trained neural network is trained with multiple sound sources (divided into the target sound source set (T) and the cancel sound source set (C)), different sensing outputs (or different geometry of the microphone array) and a training dataset (associated with a combination of clean single-microphone audio data 311$a$ and noisy single-microphone audio data 311$b$ originated from the target sound source set (T) and the cancel sound source set (C)). Accordingly, the microphone system of the invention keeps preserving/enhancing audio signals from the target sound source set (T) and suppressing/eliminating audio signals from the cancel sound source set (C), regardless of how a geometry of the microphone array is changed. Thus, according to the invention, audio quality of audio signals outputted from a microphone system in an electronic device is significantly improved.

In this disclosure, the term "adjustable mechanism" refers to a physical mechanism in an electronic device that is designed for user adjustment and causes a change in geometry of a microphone array. For example, an adjustable mechanism in a laptop refers to a hinge that is used to set an angle between a laptop screen and C side; an adjustable mechanism in a headset refers to a clamping headband that normally causes a change in geometry of a microphone array located around two earcups when a user wears the headset; an adjustable mechanism in a wearable speaker (or neck speaker) refers to an adjustable/clamping neckband that normally causes a change in geometry of a microphone array located around the two front ends when a user wears the wearable speaker. Each electronic device with an adjustable mechanism operates with a proper sensor to detect a mechanism variation of the electronic device, corresponding to a change in geometry of a microphone array. Electronic devices generally belong to 3C products that are a combination of computer, communication, and consumer electronics, also known as "information appliances." An electronic device "with an adjustable mechanism" includes, for example and without limitation, a laptop, a headset, and a wearable speaker (or neck speaker).

Figure 1:
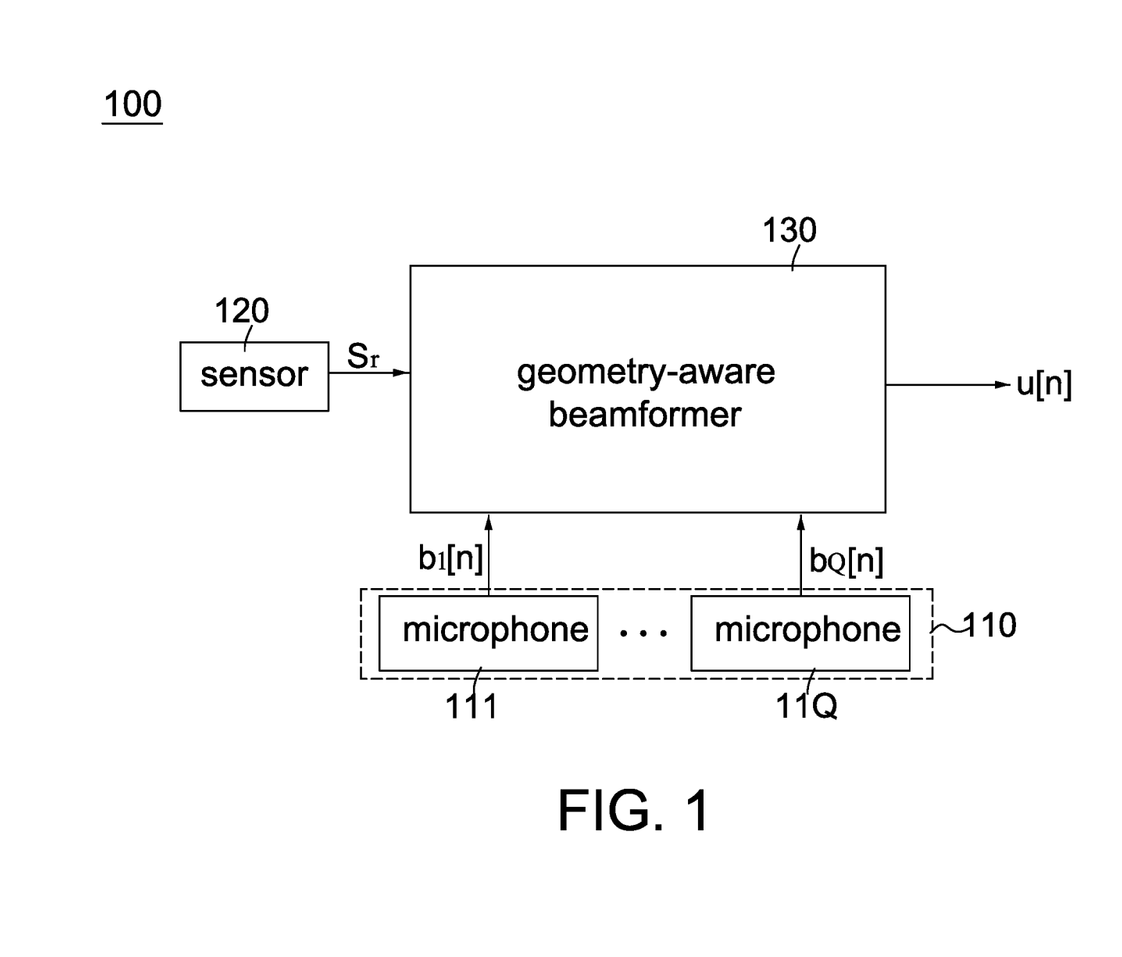
FIG. 1 is a block diagram of a microphone system according to the invention.

FIG. 1 is a block diagram of a microphone system according to the invention. Referring to FIG. 1, a microphone system 100 of the invention, applied to an electronic device with an adjustable mechanism (not shown), includes a microphone array 110, a sensor 120 and a geometry-aware beamformer 130. The microphone array 110 includes Q microphones 111 to 11Q, where Q>=2. The sensor 120 is configured to detect a mechanism variation of the electronic device to generate a sensing output Sr, where the mechanism variation is caused by a user adjustment made to the adjustable mechanism. The geometry-aware beamformer 130 is a neural network-based beamformer. According to a target sound source set (T) located in desired directions and a cancel sound source set (C) located in undesired directions and the sensing output Sr, the geometry-aware beamformer 130 performs a spatial filtering operation with/without a denoising operation over input audio signals $b_1[n]$ to $b_Q[n]$ from the microphone array 110 using a trained model (e.g., trained neural network 360T) to produce a clean (noise-free) or noisy beamformed output signal u[n] originated from the target sound source set (n, where n denotes the discrete time index.

A set of microphone coordinates for the microphone array 110 is defined as $M=\{M_1, M_2, \ldots, M_Q\}$, where the coordinates of $M_i=(xi, yi, zi)$ for microphone 11$i$ relative to a reference point at the electronic device and $1<=i<=Q$. Let a set of sound sources $S \subseteq \mathbb{R}^3$ and $d(s_j, M_i)$ be a function that denotes a time delay from a sound source $s_j$ to a microphone 11$i$, a set of time delays related to the sound source $s_j$ is defined as $dd(s_j)=[d(s_j, M_1), d(s_j, M_2), \ldots, d(s_j, M_Q)]$ while a set of time delays related to the set of sound sources S is defined as $D(S, M)=\{dd(s_1), \ldots, dd(s_L)\}$, where $\mathbb{R}^3$ denotes a three-dimensional space, $1<=j<=L$, $s \supseteq \{s_1, \ldots, s_L\}$ and L denotes the number of sound sources. The symbol/notation "~" denotes equivalent in this specification. For example, if $x,y \in \mathbb{R}^3$ and x~y, then $\exists c \in R$, s.t. $dd(x)=dd(y)+c$, where c denotes a time delay offset. The condition "x~y" represents two sound sources x and y are regarded as "equivalent" if the differences of a first set of time delays (i.e., dd(x)) and a second set of time delays (i.e., dd(y)) are equal to the time delay offset c. Therefore, we can define equivalent class $\{[x]\}=\{y: x\sim y, \forall y \in R^3\}$. In comparison with D(S, M), $\tilde{D}(S, M)=U_{d \in D(S,M)}\{[d]\}$ additionally satisfies the equivalent condition so that the symbol $\tilde{D}(S,M)$ includes multiple sound sources in the set S being regarded as "equivalent" because the differences among multiple sets of time delays for the multiple sound sources are equal to the offset c.

Through the specification and claims, the following notations/terms take the meanings explicitly associated herein, unless the context clearly dictates otherwise. The term "sound source" refers to anything producing audio information, including people, animals, or objects. Moreover, the sound source can be located at any locations in three-dimensional spaces relative to a reference point (e.g., an origin $O_g$ or a middle point between two microphones 111-112 in FIG. 2B) at the electronic device. The term "target sound source set (T)" refers to a set of sound sources located in desired directions or having desired coordinates, and audio signals from the target sound source set (T) need to be preserved or enhanced. The term "cancel sound source set (C)" refers to a set of sound sources located in un-desired directions or having un-desired coordinates, and audio signals from the cancel sound source set (C) need to be suppressed or eliminated. Normally, the target sound source set (T) and the cancel sound source set (C) are separable and thus, a boundary between the target sound source set (T) and the cancel sound source set (C) (satisfying a requirement "$\tilde{D}(T, M) \cap \tilde{D}(C,M)=\phi$") can be defined or drawn. Specifically, a boundary between the target sound source set (T) and the cancel sound source set (C) (satisfying a requirement "$\tilde{D}(T, M) \cap \tilde{D}(C, M)=\cap$") needs to be re-drawn each time the sensing output Sr indicates the device mechanism is adjusted or the geometry of the microphone array is changed.

Figure 2A:
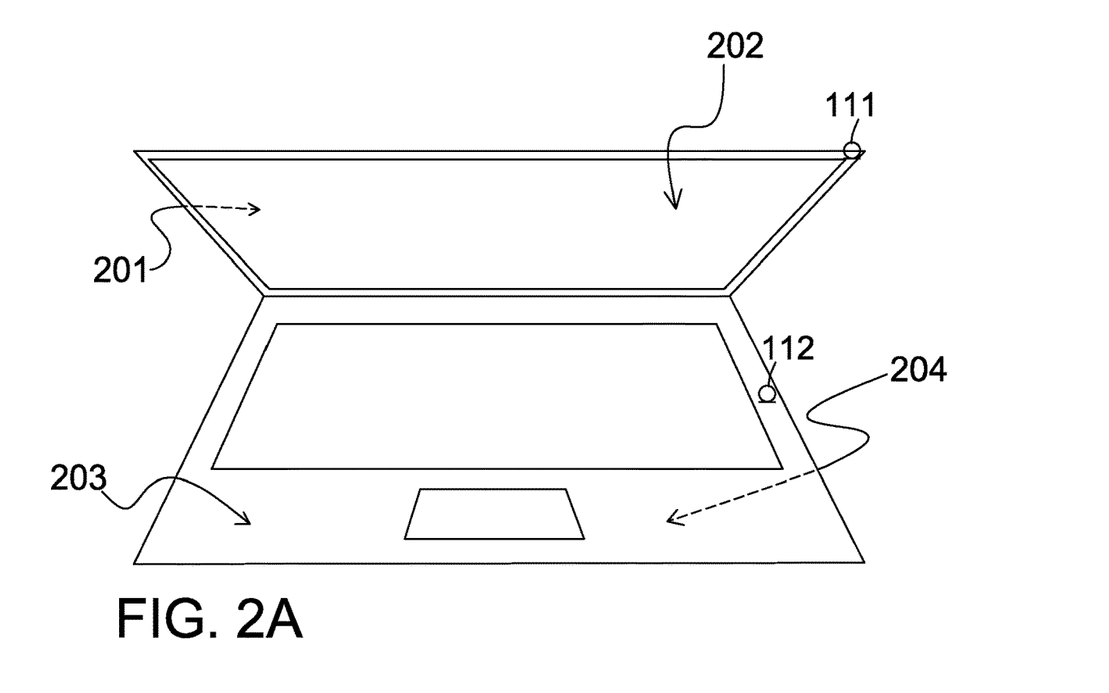
FIG. 2A is a diagram showing four sides (A side 201, B side 202, C side 203 and D side 204) of a laptop.
Figure 2B:
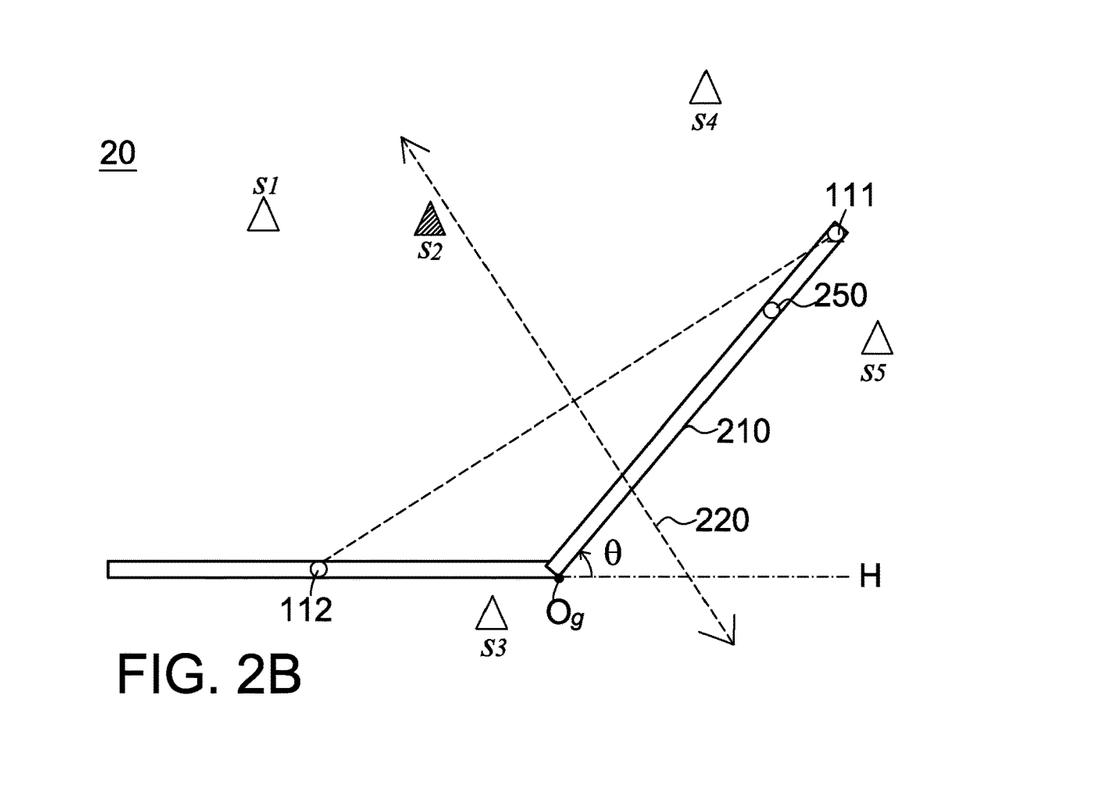
FIG. 2B is an example showing a laptop screen 210 is tilted up from the horizontal line H by θ degrees.
Figure 2C:
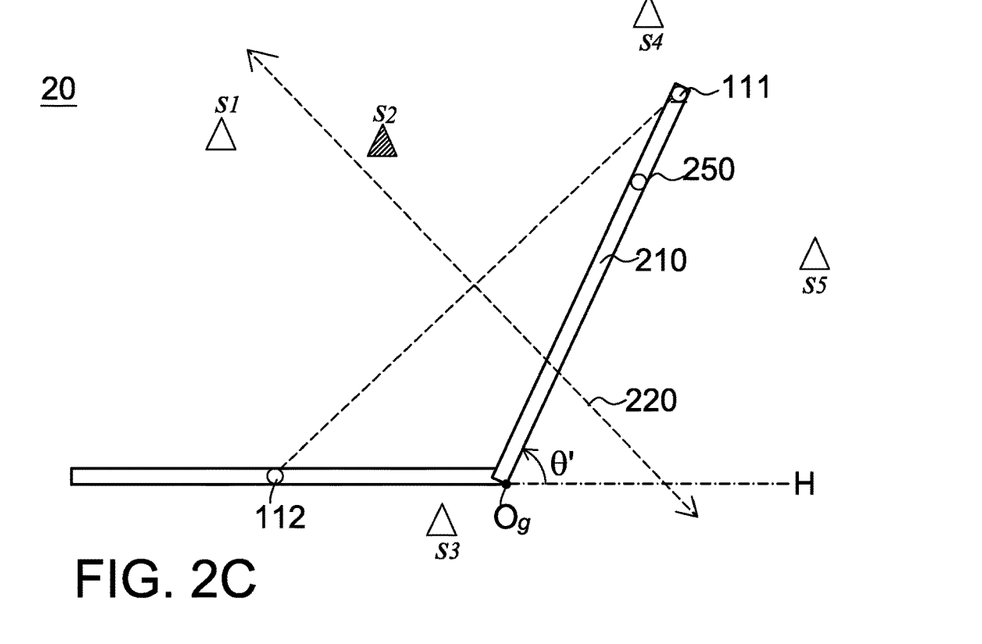
FIG. 2C is an example showing a laptop screen 210 is tilted up from θ degrees to θ' degrees.
Figure 2D:
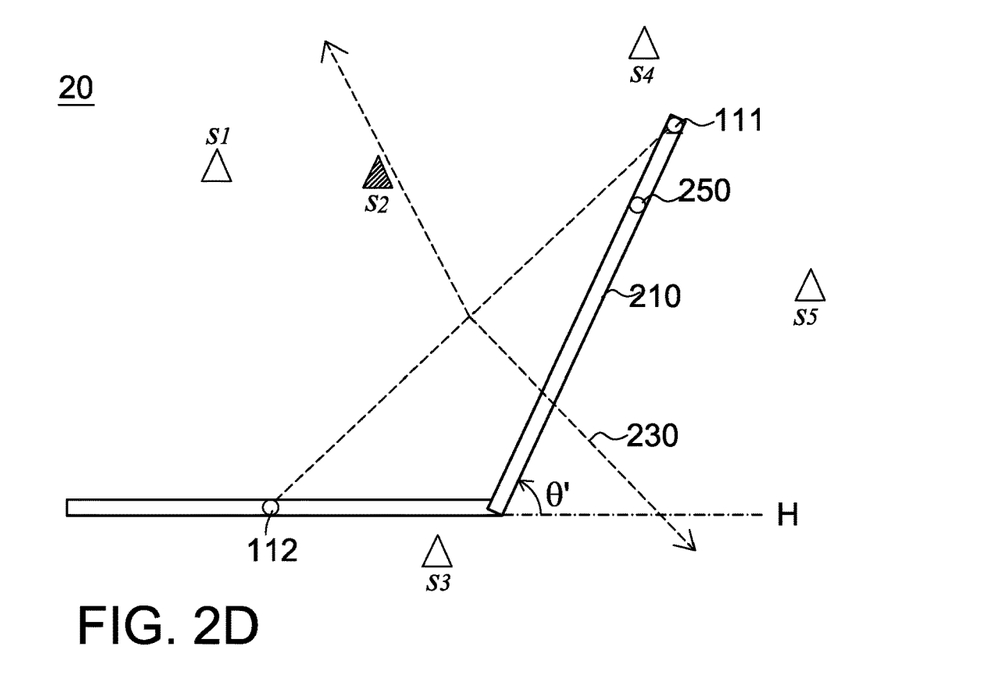
FIG. 2D is an example showing a new boundary 230 is defined based on θ' degrees.

FIG. 2A is a diagram showing four sides (A side (Back) 201, B side (Front) 202, C side (Top) 203 and D side (Bottom) 204) of a laptop. If the electronic device is a laptop, the Q microphones 111 to 11Q are respectively mounted around the rim of the laptop screen (i.e., A side 201 or B side 202) and on the C side 203 except the keyboard and touchpad areas. Please note that at least one microphone is mounted on the C side 203 that is different from the other microphones are mounted. FIGS. 2B-2D are described with the assumption that the electronic device is a laptop 20 including a microphone array 110 with two microphones 111 and 112 (i.e., Q=2), and a sensor 120 implemented by a gyroscope 250 and mounted on the A side 201 or the B side 202 of the laptop 20. An adjustable mechanism (not shown) such as a hinge, in the laptop 20 allows a user to set or adjust the angle between the laptop screen 210 and the C side 203. However, it should be understood that the above assumptions have been presented by way of example only, and not limitation of the invention. Besides, since the operations and the structure of the gyroscope 250 are well known in the art, their descriptions are omitted herein.

FIG. 2B is an example showing a laptop screen is tilted up from the horizontal line by $\theta$ degrees. Referring to FIG. 2B, two microphones 111 and 112 are respectively mounted at the top rim of B side 202 and on the right rim of C side 203 of a laptop 20 and the gyroscope 250 detects the angle $\theta$ of the laptop screen 210 relative to the horizontal line H. Given that three sound sources $s_1$-$s_3$ belong to the target sound source set (T)(i.e., $T \supseteq \{s_1,s_2,s_3\}$) and two sound sources $s_4$-$s_5$ belong to the cancel sound source set (C) (i.e., $C \supseteq \{s_4, s_5\}$), the geometry-aware beamformer 130 is configured to define a current boundary 220 (satisfies the requirement of "$\tilde{D}(T, M) \cap \tilde{D}(C, M)=\phi$") for the current angle $\theta$, so as to enhance/preserve first audio signals coming from the three sound sources $s_1$-$s_3$, and to suppress/eliminate second audio signals from the two sound sources $s_4$-$s_5$.

FIG. 2C is an example showing a laptop screen 210 is tilted up from $\theta$ degrees to $\theta'$ degrees. Referring to FIG. 2C, the above-mentioned hinge (not shown) causes the set of microphone coordinates for the microphone array 110 to change from M to M' as the laptop screen 210 is tilted up from $\theta$ degrees to $\theta'$ degrees ($\theta'>\theta$), where M'=f(ED, $\theta'$) and a coordinate function f(ED, $\theta'$) calculates a current set M' of microphone coordinates using trigonometric functions based on a current angle $\theta'$ and an Euclidean distance (ED) between the microphone 111 and an origin $O_g$ (i.e., a reference point at the laptop 20). For example, given that the ED between the microphone 111 and the origin $O_g$ is equal to 30 cm and $\theta$=60°, the set M of microphone coordinates for the microphone array 110 is calculated as follows: M=f(ED, $\theta$)={(ED*sin(60°), 0, ED*cos(60°)), (−15 cm, 0, 0)}={(15 cm, 0, 25.98 cm), (−15 cm, 0, 0)}. As the gyroscope 250 detects the laptop screen 210 is tilted up from $\theta$(=60°) to $\theta'$ (=90°), the set of microphone coordinates for the microphone array 110 are changed from M to M', where M'=f(ED, 90°)={(ED*sin(90°), 0, ED*cos(90°)), (−15 cm, 0, 0)}={(0, 0, 30 cm), (−15 cm, 0, 0)}. Here, the coordinates of microphone 112 is not changed. In the example of FIG. 2C, after the laptop screen 210 is tilted up from $\theta$ (=60°) degrees to $\theta'$ (=90°), the sound sources $s_2$ (e.g., the user's mouth) would be erroneously classified as the cancel sound source set (C) based on the previous boundary 220, i.e., $\tilde{D}(\{s_2\},M')$ ⊄ $\tilde{D}(T,M)$. To avoid this problem, a new/current boundary 230 (satisfying the requirement of "$\tilde{D}(T, M') \cap \tilde{D}(C, M')=\phi$") in FIG. 2D between the target sound source set (T) and the cancel sound source set (C) needs to be determined again by the geometry-aware beamformer 130 as soon as $\theta'$ is not equal to $\theta$. Once a current boundary 230 is determined, the sound source $s_2$ (e.g., the user's mouth) would be correctly classified as the target sound source set (T) and thus the signal from the sound source $s_2$ would be properly enhanced/preserved by the geometry-aware beamformer 130. Please note that the origin $O_g$ in FIGS. 2B-2C may be located at a different location, such as the leftmost edge on the D side 204 in FIG. 2C. Thus, the above coordinate function f(ED, $\theta$) may be varied according to different locations of the origin $O_g$.

Referring back to FIG. 1, the geometry-aware beamformer 130 may be implemented by a software program, custom circuitry, or by a combination of the custom circuitry and the software program. For example, the geometry-aware beamformer 130 may be implemented using at least one storage device and at least one of a GPU (graphics processing unit), a CPU (central processing unit), and a processor. The storage device stores multiple instructions to be executed by the at least one of the GPU, the CPU, and the processor to perform all the steps of the method of FIG. 5 or the operations of the geometry-aware beamformer 130/130I/130T in FIGS. 3A-3C, as will be described in greater detail below. Furthermore, persons of ordinary skill in the art will understand that any system that performs the operations of the geometry-aware beamformer 130 (or the steps of the method of FIG. 5) is within the scope and spirit of embodiments of the present invention.

Figure 3A:
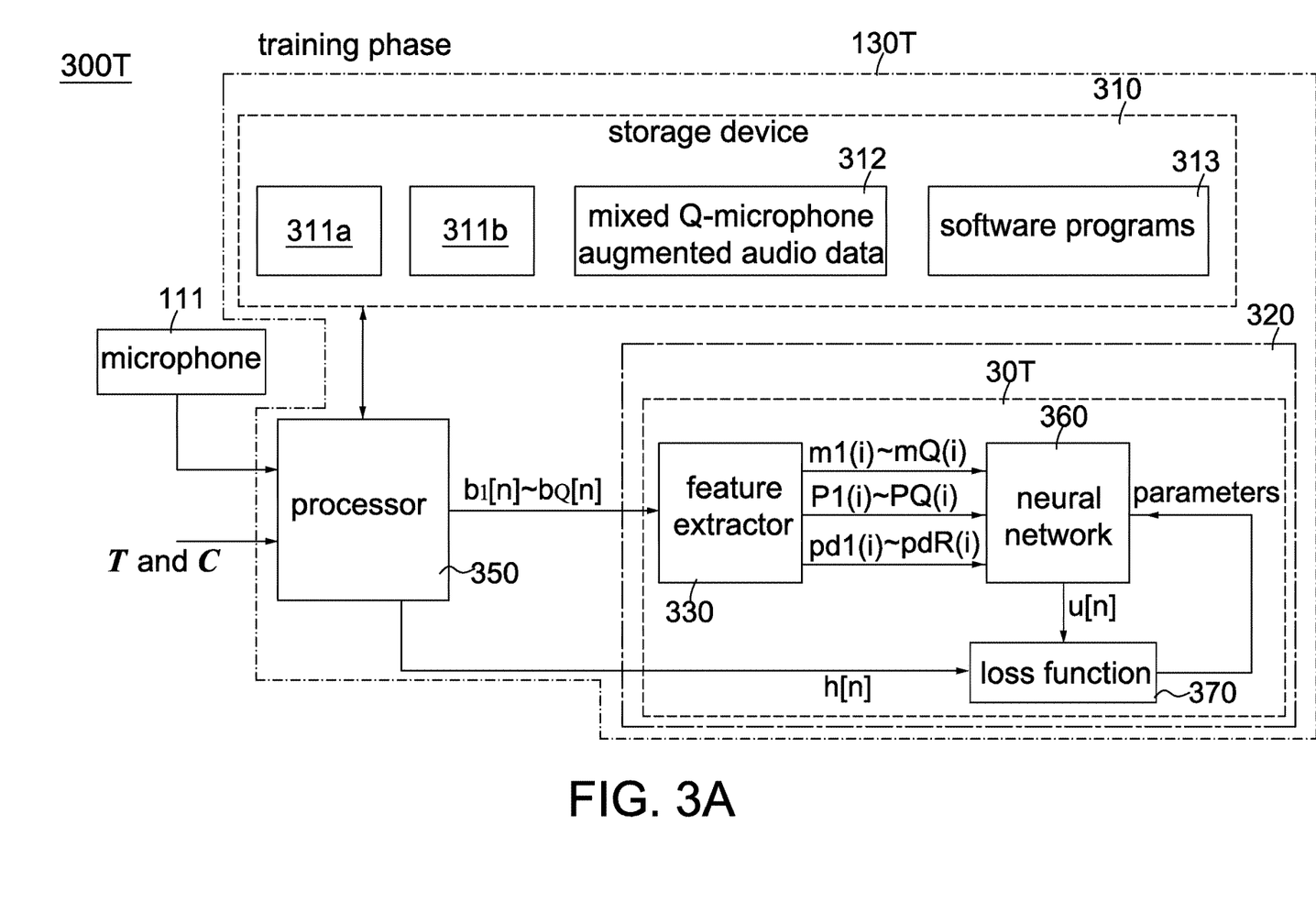
FIG. 3A is an example apparatus of a microphone system in a training phase according to an embodiment of the invention.

FIG. 3A is an exemplary diagram of a microphone system 300T in a training phase according to an embodiment of the invention. In the embodiment of FIG. 3A, a microphone system 300T in a training phase, applied to a laptop with an adjustable mechanism (not shown), includes a microphone 111 and a geometry-aware beamformer 130T. In the training phase, only one microphone 111 is used for recording audio data or signals, and the geometry-aware beamformer 130T is implemented by a processor 350 and two storage devices 310 and 320. The storage device 310 stores instructions/program codes of software programs 313 operable to be executed by the processor 350 to cause the processor 350 to function as: the geometry-aware beamformer 130/130T/130I.

In an embodiment, a neural network module 30T/30I, implemented by software and resident in the storage device 320, includes a feature extractor 330, a neural network 360 and a loss function block 370. In an alternative embodiment, the neural network module 30T/30I is implemented by hardware (not shown), such as discrete logic circuits, application specific integrated circuits (ASIC), programmable gate arrays (PGA), field programmable gate arrays (FPGA), etc.

The neural network 360 of the invention may be implemented by any known neural network. Various machine learning techniques associated with supervised learning may be used to train a model of the neural network 360. Example supervised learning techniques to train the neural network 360 include, for example and without limitation, stochastic gradient descent (SGD). In the context of the following description, the neural network 360 operates in a supervised setting using a training dataset including multiple training examples, each training example including training input data (such as audio data in each frame of input audio signals $b_1[n]$ to $b_Q[n]$ in FIG. 3A) and training output data (ground truth) (such as audio data in each corresponding frame of output audio signals h[n] in FIG. 3A) pairs.

The neural network 360 is configured to use the training dataset to learn or estimate the function f (i.e., a trained model 360T), and then to update model weights using the backpropagation algorithm in combination with the cost function block 370. Backpropagation iteratively computes the gradient of cost function relative to each weight and bias, then updates the weights and biases in the opposite direction of the gradient, to find a local minimum. The goal of a learning in the neural network 360 is to minimize the cost function given the training dataset.

Prior to the training phase, the processor 350 is configured to respectively store a batch of noise-free (or clean) single-microphone time-domain raw audio data 311a and a batch of noisy single-microphone time-domain raw audio data 311b received from a single microphone 111 into the storage device 310. For the noisy single-microphone time-domain raw audio data 311b, various sources of noise are recorded, including animals, white noise, computer fans, crowd, car, airplane, construction, etc. By executing a software program 313 of any well-known simulation tools, such as Pyroomacoustics, stored in the storage device 310, the processor 350 operates as a data augmentation engine to construct different simulation scenarios involving L sound sources (divided into a target sound source set (T) and a cancel sound source set (C)), Q microphones, different angles θ of the laptop screen 210 and different acoustic environments based on the clean and the noisy single-microphone raw audio data 311a and 311b, where $0°<=θ<=180°$. The main purpose of the data augmentation engine 350 is to help the neural network 360 to generalize, so that the neural network 360 can operate in different acoustic environments and different microphone geometry (e.g., different angles θ). Specifically, with Pyroomacoustics and different angles θ, the data augmentation engine 350 respectively transforms the clean and the noisy single-microphone time-domain audio data 311a and 311b into clean Q-microphone time-domain augmented audio data and noisy Q-microphone time-domain augmented audio data originated from one or more sources of the target sound source set (T) and the cancel sound source set (C), and then mixes the clean and the noisy Q-microphone time-domain augmented audio data to generate and store a mixed Q-microphone time-domain augmented audio data 312 in the storage device 310. In particular, the noisy Q-microphone time-domain augmented audio data is mixed at different levels with the clean Q-microphone time-domain augmented audio data to produce a wide range of SNRs for the mixed Q-microphone time-domain augmented audio data 312. In the training phase, the mixed Q-microphone time-domain augmented audio data 312 are used by the processor 350 as the training input data (i.e., $b_1[n]$ to $b_Q[n]$) for the training examples of the training dataset; correspondingly, clean or noisy time-domain output audio data transformed from a combination of the clean single-microphone time-domain audio data 311a and the noisy single-microphone time-domain audio data 311b (that are all originated from the target source set (T)) are used by the processor 350 as the training output data (i.e., h[n]) for the training examples of the training dataset.

Figure 3B:
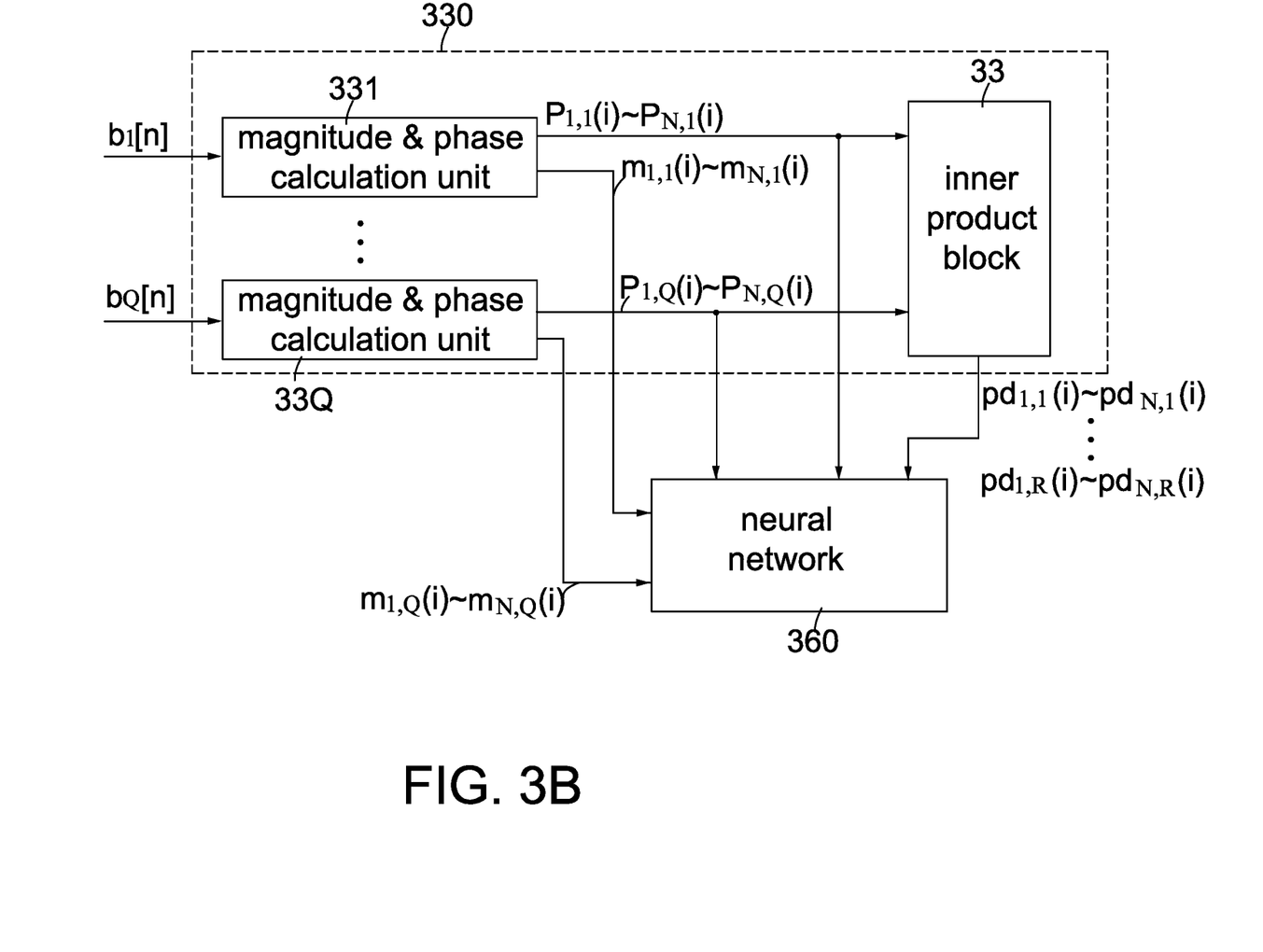
FIG. 3B is a diagram of a feature extractor 330 according to an embodiment of the invention.

FIG. 3B is a schematic diagram of a feature extractor 330 according to an embodiment of the invention. Referring to FIG. 3B, the feature extractor 330, including Q magnitude & phase calculation units 331-33Q and an inner product block 33, is configured to extract features (e.g., magnitudes, phases and phase differences) from complex-valued samples of audio data of each frame in Q input audio streams ($b_1[n]$ to $b_Q[n]$).

In each magnitude & phase calculation unit 33j, the input audio stream $b_j[n]$ is firstly broken up into frames using a sliding window along the time axis so that the frames overlap each other to reduce artifacts at the boundary, and then, the audio data in each frame in time domain are transformed by Fast Fourier transform (FFT) into complex-valued data in frequency domain, where $1<=j<=Q$ and n denotes the discrete time index. Assuming a number of sampling points in each frame (or the FFT size) is N, the time duration for each frame is Td and the frames overlap each other by Td/2, the magnitude & phase calculation unit 33j divides the input stream $b_j[n]$ into a plurality of frames and computes the FFT of audio data in the current frame i of the input audio stream $b_j[n]$ to generate a current spectral representation $F_j(i)$ having N complex-valued samples ($F_{1,j}(i)$-$F_{N,j}(i)$) with a frequency resolution of fs/N(=1/Td), where $1<=j<=Q$, i denotes the frame index of the input/output audio stream $b_j[n]/u[n]/h[n]$, fs denotes a sampling frequency of the input audio stream $b_j[n]$ and each frame corresponds to a different time interval of the input stream $b_j[n]$. Next, the magnitude & phase calculation unit 33j calculates a magnitude and a phase for each of N complex-valued samples ($F_{1,j}(i), \ldots, F_{N,j}(i)$) based on its length and arctangent function to generate a magnitude spectrum (mj(i)=$m_{1,j}(i), \ldots, m_{N,j}(i)$) with N magnitude elements and a phase spectrum (Pj(i)=$P_{1,j}(i), \ldots, P_{N,j}(i)$) with N phase elements for the current spectral representation Fj(i) (=$F_{1,j}(i), \ldots F_{N,j}(i)$). Then, the inner product block 33 calculates the inner product for each of N normalized-complex-valued sample pairs in any two phase spectrums Pj(i) and Pk(i) to generate R phase-difference spectrums (pdl(i)=$pd_{1,l}(i), \ldots, pd_{N,l}(i)$), each phase-difference spectrum pdl(i) having N elements, where $1<=k<=Q$, $j≠k$, $1<=l<=R$, and there are R microphone pairs among the Q microphones. Finally, the Q magnitude spectrums mj(i), the Q phase spectrums Pj(i) and the R phase-difference spectrums pdl(i) are used/regarded as a feature vector fv(i) and fed to the neural network 360/360T. In a preferred embodiment, the time duration Td of each frame is about 32 milliseconds (ms). However, the above time duration Td is provided by way of example and not limitation of the invention. In actual implementations, other time duration Td may be used.

In the training phase, the neural network 360 receives the feature vector fv(i) including the Q magnitude spectrums m1(i)-mQ(i), the Q phase spectrums P1(i)-PQ(i) and the R phase-difference spectrums pd1(i)-pdQ(i), and then generates corresponding network output data, including N first sample values of the current frame i of a time-domain beamformed output stream u[n]. On the other hand, the training output data (ground truth), paired with the training input data (i.e., Q*N input sample values of the current frames i of the Q training input streams $b_1[n]$ to $b_Q[n]$) for the training examples of the training dataset, includes N second sample values of current frame i of a training output audio stream h[n] and are transmitted to the loss function block 370 by the processor 350. If the neural network 360 is trained to perform the spatial filtering operation only, the training output audio stream h[n] outputted from the processor 350 would be the noisy time-domain output audio data (transformed from the noisy single-microphone time-domain audio data 311b originated from the target source set (T)). If the neural network 360 is trained to perform spatial filtering and denoising operations, the training output audio stream h[n] outputted from the processor 350 would be the clean time-domain output audio data (transformed from the clean single-microphone time-domain audio data 311*a* originated from the target source set (T)). Then, the loss function block 370 adjusts parameters (e.g., weights) of the neural network 360 based on differences between the network output data and the training output data. In one embodiment, the neural network 360 is implemented by a deep complex U-Net, and correspondingly the loss function implemented in the loss function block 370 is weighted-source-to-distortion ratio (weighted-SDR) loss, disclosed by Choi et al., "Phase-aware speech enhancement with deep complex U-net", a conference paper at ICRL 2019. However, it should be understood that the deep complex U-Net and the weighted-SDR loss have been presented by way of example only, and not limitation of the invention. In actual implementations, any other neural networks and loss functions can be used and this also falls in the scope of the invention. Finally, the neural network 360 is trained so that the network output data (i.e., the N first sample values in u[n]) produced by the neural network 360 matches the training output data (i.e., the N second sample values in h[n]) as closely as possible when the training input data (i.e., the Q*N input sample values in $b_1[n]$-$b_Q[n]$) paired with the training output data is processed by the neural network 360.

Figure 3C:
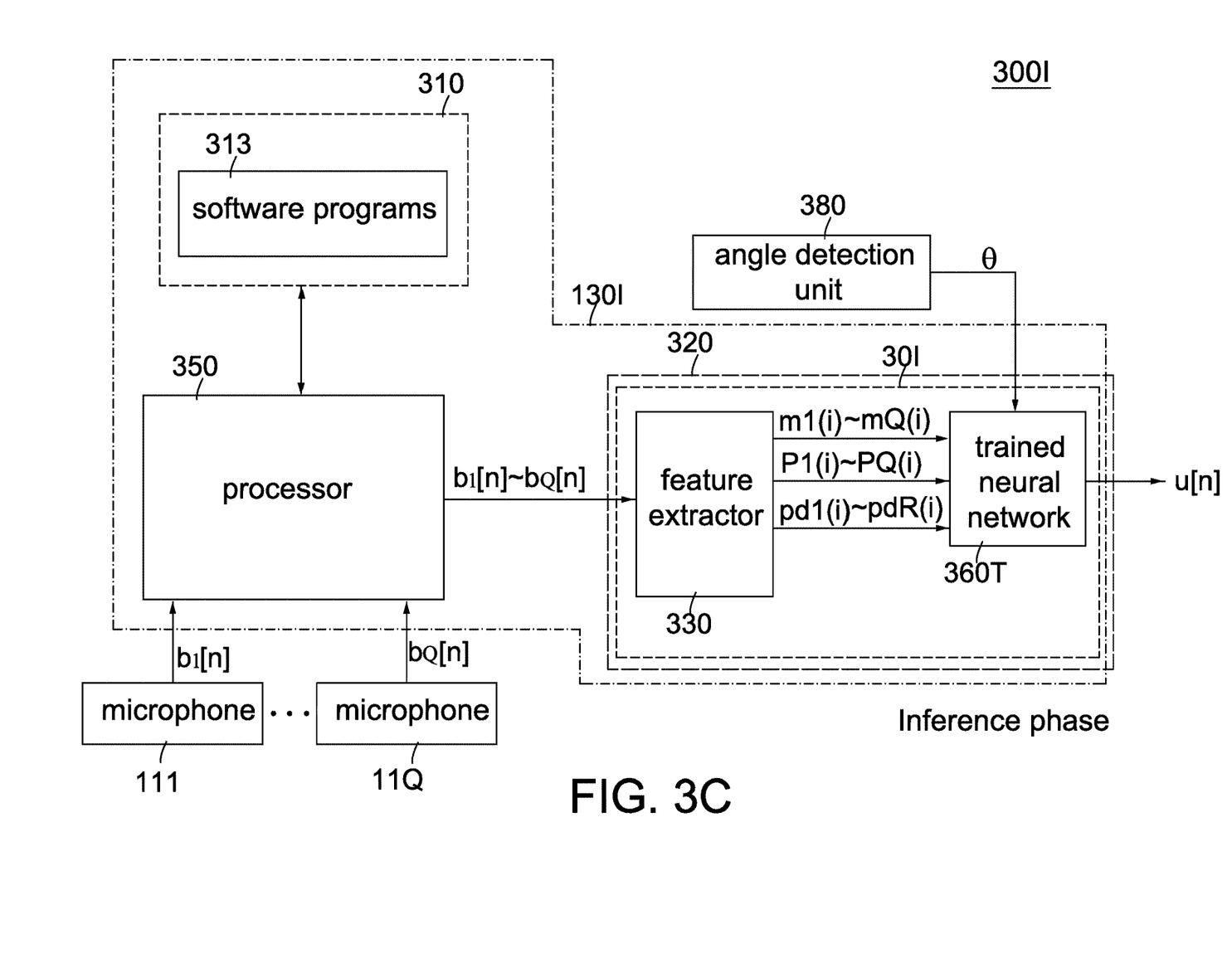
FIG. 3C is an example apparatus of a microphone system in an inference phase according to an embodiment of the invention.

FIG. 3C is an example apparatus of a microphone system 300I in an inference phase according to an embodiment of the invention. In the embodiment of FIG. 3C, a microphone system 300I in an inference phase, applied to a laptop with an adjustable mechanism (not shown), includes Q microphones 111-11Q, an angle detection unit 380 and a geometry-aware beamformer 130I. The angle detection unit 380 (e.g., gyroscope 250) is configured to measure the angle θ of the laptop screen 210 relative to a horizontal line H by gravity, magnetic force, mechanism transformation, or the like, as shown in FIGS. 2B-2D. The angle detection unit 380 may include, for example and without limitation, a gyroscope. In the embodiment of FIG. 3C, in the inference phase, only the software programs 313 are resident in the storage device 310; a neural network module 30I, implemented by software and resident in the storage device 320, includes the feature extractor 330 and the trained neural network 360T. The trained neural network 360T calculates a current set M of microphone coordinates using the above coordinate function f(ED, θ) according to a current angle θ and then determines a current boundary (satisfying the requirement of "$\tilde{D}(T, M) \cap \tilde{D}(C, M) = \phi$") between the target sound source set (T) and the cancel sound source set (C) (e.g., steps S506-S508 in FIG. 5). Meanwhile, the feature extractor 330 extracts a feature vector fv(i) (including Q magnitude spectrums m1(*i*)-mQ(i), Q phase spectrums P1(*i*)-PQ(i) and R phase-difference spectrums pd1(*i*)-pdQ(i)) from Q current spectral representations F1(*i*)-FQ(i) of audio data of current frames i in Q input audio streams ($b_1[n]$ to $b_Q[n]$). The trained neural network 360T performs spatial filtering operation (with or without denoising operation) over the feature vector fv(i) for the current frames i of the live input audio streams $b_1[n]$-$b_Q[n]$ based on the current boundary to generate audio data of the current frame i of the beamformed output stream u[n] originated from the target sound source set (T). Afterward, while receiving a current angle θ' different from a previous angle θ from the angle detection unit 380, the trained neural network 360T proceeds to update the current set M of microphone coordinates and the current boundary for the subsequent input audio streams $b_1[n]$-$b_Q[n]$.

Figure 4A:
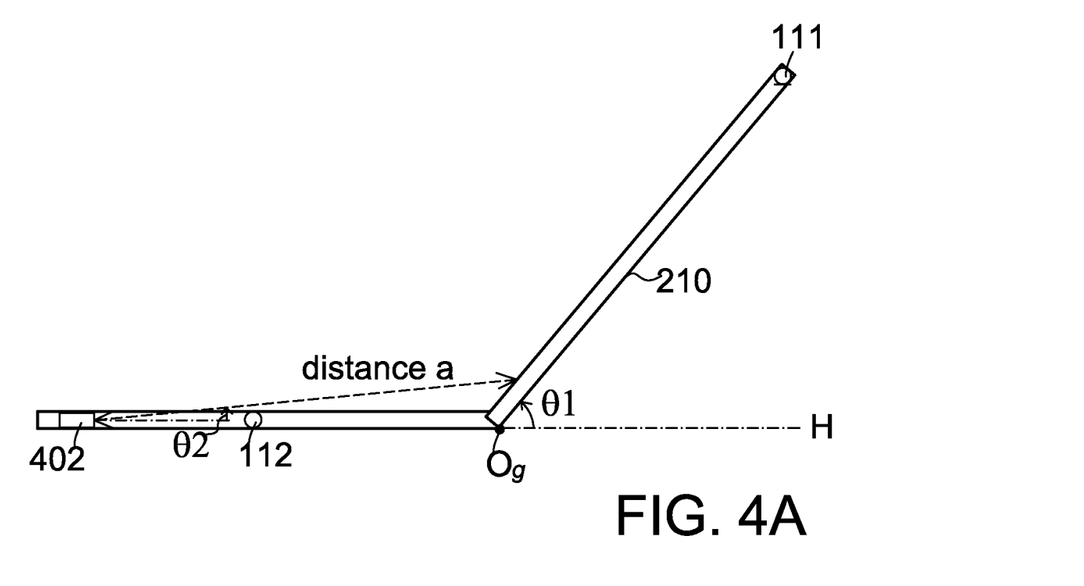
FIGS. 4A-4B show an example that a Lidar sensor is used to detect whether the laptop screen is tilted up/down.
Figure 4B:
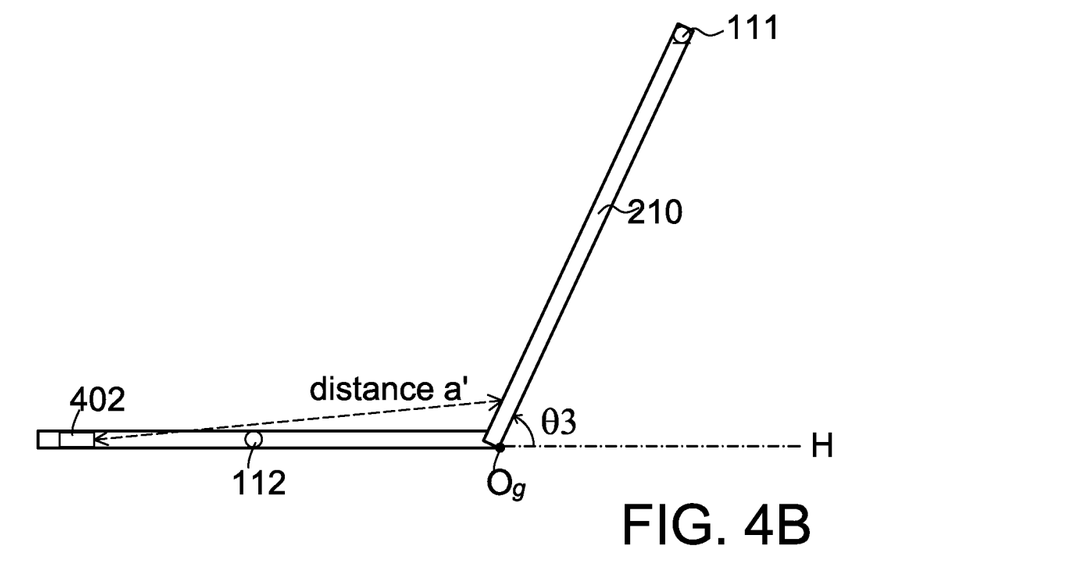

The above examples and embodiments are all directed to the laptop operating with the angle detection unit 380 (or a gyroscope). In an alternative embodiment, a laptop may operate with a different type of sensor, such as a well-known light detection and ranging (Lidar) sensor. In this scenario, a Lidar sensor 402 may be mounted on the B side 202 or C side 203 to detect whether the distance between the C side 203 and the laptop screen 210 is changed. As shown in the example of FIGS. 4A-4B, a Lidar sensor 402 is mounted on the C side 203 to measure the distance between the Lidar sensor 402 and the laptop screen 210. In the training phase, similar to the example of FIG. 3A, the neural network 360 is trained with L sound sources (divided into the target sound source set (T) and the cancel sound source set (C)), different distances between the Lidar sensor 402 and the laptop screen 210, and a training dataset (associated with a combination of clean single-microphone audio data and noisy single-microphone audio data originated from the target sound source set (T) and the cancel sound source set (C)). In the inference phase, similar to the example of FIG. 3C, the angle detection unit 380 would be replaced with the Lidar sensor 402 so that the Lidar sensor 402 transmits a current distance to the trained neural network 360T while the other components perform similar operations. Specifically, in the inference phase, the Lidar sensor 402 firstly measures a current distance a between the Lidar sensor 402 and the laptop screen 210 as shown in FIG. 4A. Then, the trained neural network 360T calculates the angle θ1 of the laptop screen 210 relative to the horizontal line H according to the current distance a, a fixed x-axis distance between the Lidar sensor 402 and the origin $O_g$, and a fixed degree θ2 that the Lindar sensor 402 targets the laptop screen 210 relative to the horizontal line H. After that, the trained neural network 360T calculates a current set M of microphone coordinates using the above coordinate function f(ED, θ1), and then determines a current boundary (satisfying the requirement of "$\tilde{D}(T, M) \cap \tilde{D}(C, M) = \phi$" between the target sound source set (T) and the cancel sound source set (C) (e.g., steps S506-S508 in FIG. 5). Next, the trained neural network 360T performs spatial filtering operation with/without denoising operation over the feature vector fv(i) for the Q input microphone streams $b_1[n]$-$b_Q[n]$ based on the current boundary to generate the beamformed output stream u[n] originated from the target sound source set (T). Afterward, while receiving a current distance a' different from a previous distance a from the Lidar sensor 402, the trained neural network 360T proceeds to update the current set M of microphone coordinates and the current boundary for the subsequent input audio streams $b_1[n]$-$b_Q[n]$.

Figure 5:
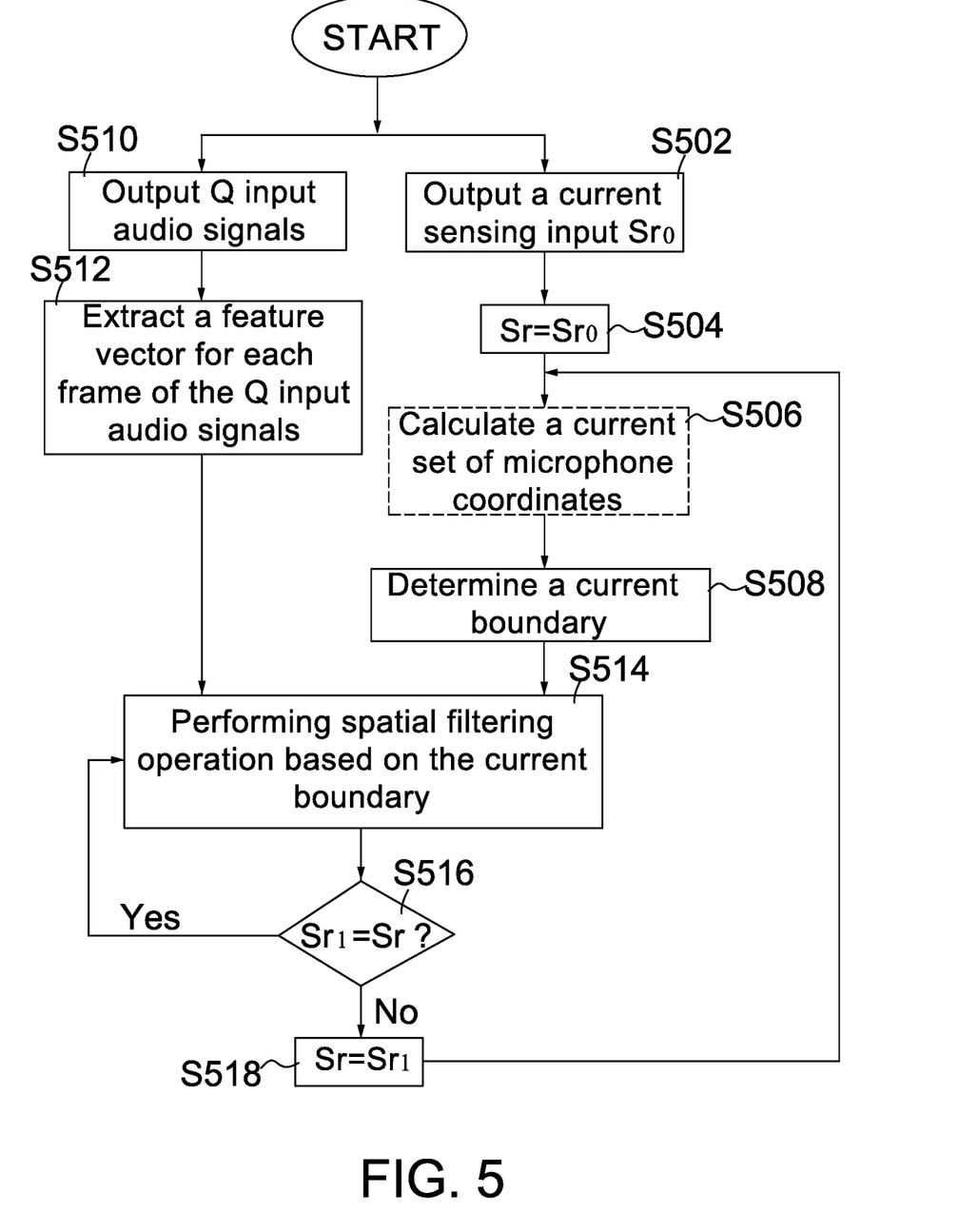
FIG. 5 is a flow chart showing a beamforming method according to an embodiment of the invention.

FIG. 5 is a flow chart showing a beamforming method according to an embodiment of the invention. The beamforming method of the invention, applicable to a microphone system 100 in an electronic device, is described with reference FIGS. 1, 2B-2D, 3C and 5. The electronic device comprises an adjustable mechanism (not shown). It is assumed that the trained neural network 360T is already trained with a training dataset, L sound sources (divided into a target sound source set (T) and a cancel sound source set (C)), the mixed Q-microphone augmented audio data 312 and different geometry of the microphone array. The training dataset includes multiple training examples, each training example including training input data and training output data (ground truth) pairs.

Step S502: Output a current sensing output $Sr_0$ from a sensor 120 after system initialization. For example, a current degree θ is outputted from the angle detection unit 380 in FIG. 3C.

Step S504: Set a parameter Sr equal to $Sr_0$.

Step S506: Calculate a current set M of microphone coordinates by the trained neural network 360T according to the current sensing output Sr and locations of a reference point and the Q microphones disposed on the electronic device. In the example of FIG. 2B, calculate a current set M of microphone coordinates according to the above coordinate function f(ED, θ), the origin $O_g$ (i.e., the reference point at the intersection of A/B side and C/D side of the laptop 20) and the input angle θ (i.e., the current sensing output Sr). In other words, the calculation of the current set M of microphone coordinates depends on the physical characteristic of the sensor 120, locations of the reference point $O_g$ and the Q microphones disposed on the electronic device.

Step S508: Determine a current boundary between the target sound source set (T) and the cancel sound source set (C) based on the current set M of microphone coordinates using the trained neural network 360T, i.e., the current boundary satisfying the requirement of "$\bar{D}(T, M) \cap \bar{D}(C,M) = \phi$". In an alternative embodiment, due to one-by-one correspondence between the multiple sets M of microphone coordinates and the multiple sensing outputs Sr (e.g., the multiple input angles θ), there is no need to calculate the current set M of microphone coordinates. Thus, step S506 is eliminated and step S508 is modified as follows: determine a current boundary between the target sound source set (T) and the cancel sound source set (C) based on the current sensing output Sr using the trained neural network 360T. Since the step S506 is optional, it is represented by dash-line rectangle in FIG. 5.

Step S510: Detect sound to output Q audio streams $b_1[n]$-$b_Q[n]$ from the Q microphones 111-11Q in the microphone array 110.

Step S512: Extract a feature vector fv(i) for Q input audio streams $b_1[n]$-$b_Q[n]$ by the feature extractor 330. As described in connection with FIG. 3B, based on the current spectral representations F1(i)-FQ(i) for current frames i of the Q input audio streams $b_1[n]$-$b_Q[n]$, the feature extractor 330 generates the Q magnitude spectrums m1(i)-mQ(i), the Q phase spectrums P1(i)-PQ(i) and the R phase-difference spectrums pd1(i)-pdQ(i) as a feature vector fv(i) for current frames i of the Q input audio streams $b_1[n]$-$b_Q[n]$.

Step S514: Perform a spatial filtering operation with/without a denoising operation over the feature vector fv(i) using the trained neural network 360T according to the current boundary to generate audio data of the frame i of a beamformed output stream u[n] originated from one or more sound sources of the target sound source set (T). For example, if only the spatial filtering operation is performed, the beamformed output stream u[n] would be the "noisy" audio signals originated from the target sound source set (T); if the spatial filtering and the denoising operations are performed, the beamformed output stream u[n] would be the noise-free (or clean) audio signals originated from the target sound source set (T).

Step S516: Determine whether a current sensing output $Sr_1$ from the sensor 120 is equal to a previous sensing output Sr. If YES, the flow returns to step S514; otherwise, the flow goes to step S518.

Step S518: Set Sr equal to $Sr_1$. Then, the flow returns to step S506.

Although illustrated as discrete blocks, various blocks (S502-S514) in FIG. 5 may be divided into additional blocks, combined into fewer blocks, or eliminated, depending on the desired implementation.

The microphones 111-11Q in the microphone array 110 may be, for example, omnidirectional microphones, bi-directional microphones, directional microphones, or a combination thereof. The microphones 111-11Q in the microphone array 110 may be implemented by digital or analog MEMS (MicroElectrical-Mechanical System) microphones. Please note that when directional or bi-directional microphones are included in the microphone array 100, a circuit designer needs to ensure the directional or the bi-directional microphones are capable of receiving all the audio signal originated from the target sound source set (T) regardless how the geometry of the microphone array 110 is adjusted. For a headset, the microphones 111-11Q in the microphone array 110 are respectively disposed around the two earcups, such as on the right and the left earcups or housed in two front ends of two microphones arms connected to the right and left earcups. For a wearable speaker (or neck speaker), the microphones 111-11Q in the microphone array 110 are respectively built/embedded in two front ends.

Certain embodiments have been described. However, various modifications to these embodiments are possible, and the principles presented herein may be applied to other embodiments as well. For example, the principles disclosed herein may be applied to other electronic devices, such as a headset or a wearable speaker (or neck speaker), each operating with a rotary potentiometer (as a sensor 120). Since the operations and the structure of the rotary potentiometer are well known in the art, their descriptions are omitted herein. Normally, the rotary potentiometer in a headset is disposed in the middle point (e.g., the top of the user's head) of its clamping headband while the rotary potentiometer in a wearable/neck speaker is disposed in the middle point (i.e., behind the neck) of its adjustable/clamping neckband. It should be understood that the invention is not limited to the above-mentioned electronic devices and sensors described above, but fully extensible to any existing or yet-to-be developed electronic devices and sensors as long as the sensor can detect a mechanism variation (equivalent to a change in the geometry of the microphone array 110) in the electronic device. In addition, the various components may be implemented in arrangements other than those specifically disclosed without departing from the scope of the claims.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A microphone system, applied to an electronic device comprising an adjustable mechanism that causes a change in geometry of a microphone array, comprising:

the microphone array comprising multiple microphones that detect sound and generate multiple audio signals;

a sensor for detecting a mechanism variation of the electronic device to generate a sensing output; and a beamformer configured to perform a set of operations comprising:

performing spatial filtering over the multiple audio signals using a trained model based on the sensing output, one or more first sound sources in one or more desired directions and one or more second sound sources in one or more undesired directions to generate a beamformed output signal originated from the one or more first sound sources, wherein the operation of performing the spatial filtering further comprises:

determining a boundary between the one or more first sound sources and the one or more second sound sources using the trained model according to the sensing output; and performing the spatial filtering over the multiple audio signals using the trained model based on the boundary to generate the beamformed output signal.

2. The system according to claim 1, wherein the operation of determining the boundary comprises:

calculating coordinates of the multiple microphones according to the sensing output and locations of the multiple microphones disposed on the electronic device; and determining the boundary between the one or more first sound sources and the one or more second sound sources using the trained model according to the coordinates of the multiple microphones.

3. The system according to claim 1, wherein the set of operations further comprises:

performing a denoising operation over the multiple audio signals using the trained model based on the sensing output, the one or more first sound sources and the one or more second sound sources to generate the beamformed output signal without noise originated from the one or more first sound sources.

4. The system according to claim 1, wherein the operation of performing the spatial filtering further comprises:

performing the spatial filtering over a feature vector for the multiple audio signals using the trained model based on the sensing output, the one or more first sound sources and the one or more second sound sources to generate the beamformed output signal originated from the one or more first sound sources;

wherein the set of operations further comprises:

extracting the feature vector from multiple spectral representations of the multiple audio signals;

wherein the feature vector comprises multiple magnitude spectrums, multiple phase spectrums and multiple phase-difference spectrums.

5. The system according to claim 1, wherein the electronic device is a laptop, and the multiple microphones are respectively disposed on an outer rim of a laptop screen and C side, and wherein the adjustable mechanism is a hinge.

6. The system according to claim 1, wherein the electronic device is a laptop, and the sensor is a gyroscope mounted on one of A side and B side.

7. The system according to claim 1, wherein the electronic device is a laptop, and the sensor is a Lidar sensor mounted on one of B side and C side.

8. The system according to claim 1, wherein the electronic device is a headset, and wherein the adjustable mechanism is a clamping headband, and the sensor is a rotary potentiometer disposed in a middle point of the clamping headband.

9. The system according to claim 1, wherein the electronic device is a headset, and the multiple microphones are respectively disposed around two earcups.

10. The system according to claim 1, wherein the electronic device is a wearable speaker, and wherein the adjustable mechanism is an adjustable neckband, and the sensor is a rotary potentiometer disposed in a middle point of the adjustable neckband.

11. The system according to claim 1, wherein the electronic device is a wearable speaker and the multiple microphones are respectively embedded in two front ends of the wearable speaker.

12. The system according to claim 1, wherein the trained model is a neural network that is trained with the one or more first sound sources, the one or more second sound sources, multiple sensing outputs and a training dataset, and wherein the training dataset is associated with a combination of clean single-microphone audio data and noisy single-microphone audio data originated from the one or more first sound sources and the one or more second sound sources.

13. A beamforming method for a microphone system in an electronic device, the electronic device comprising an adjustable mechanism, the method comprising:

detecting sound by multiple microphones in a microphone array to generate multiple audio signals;

detecting a mechanism variation of the electronic device by the sensor to generate a sensing output, wherein the adjustable mechanism causes a change in geometry of the microphone array; and performing a spatial filtering operation over the multiple audio signals using a trained model based on the sensing output, one or more first sound sources in one or more desired directions and one or more second sound sources in one or more undesired directions to generate a beamformed output signal originated from the one or more first sound sources, wherein said performing the spatial filtering operation further comprises:

determining a boundary between the one or more first sound sources and the one or more second sound sources using the trained model according to the sensing output; and performing the spatial filtering operation over the multiple audio signals using the trained model based on the boundary to generate the beamformed output signal.

14. The method according to claim 13, wherein the step of determining the boundary comprises:

calculating coordinates of the multiple microphones according to the sensing output and locations of the multiple microphones disposed on the electronic device; and determining the boundary between the one or more first sound sources and the one or more second sound sources using the trained model according to the coordinates of the multiple microphones.

15. The method according to claim 13, further comprising:

performing a denoising operation over the multiple audio signals using the trained model based on the sensing output, the one or more first sound sources and the one or more second sound sources to generate the beamformed output signal without noise originated from the one or more first sound sources.

16. The method according to claim 13, further comprising:

prior to the step of the spatial filtering operation, extracting a feature vector from multiple spectral representations of the multiple audio signals;

wherein the step of performing the spatial filtering operation further comprises:

performing the spatial filtering operation over the feature vector using the trained model based on the sensing output, the one or more first sound sources and the one or more second sound sources to generate the beamformed output signal originated from the one or more first sound sources;

wherein the feature vector comprises multiple magnitude spectrums, multiple phase spectrums and multiple phase-difference spectrums.

17. The method according to claim 13, further comprising:
respectively disposing the multiple microphones on an outer rim of a laptop screen and C side;
wherein the electronic device is a laptop.

18. The method according to claim 13, further comprising:
disposing the sensor on one of A side and B side;
wherein the sensor is a gyroscope and the electronic device is a laptop.

19. The method according to claim 13, further comprising:
disposing the sensor on one of B side and C side;
wherein the sensor is a Lidar sensor and the electronic device is a laptop.

20. The method according to claim 13, wherein the electronic device is a headset, and the adjustable mechanism is a clamping headband.

21. The method according to claim 20, further comprising:
respectively disposing the multiple microphones around two earcups; and
disposing the sensor in a middle point of the clamping headband;
wherein the sensor is a rotary potentiometer.

22. The method according to claim 13, wherein the electronic device is a wearable speaker, and the adjustable mechanism is an adjustable neckband.

23. The method according to claim 22, further comprising:
respectively embedding the multiple microphones in two front ends; and
disposing the sensor in a middle point of the adjustable neckband;
wherein the sensor is a rotary potentiometer.

24. The method according to claim 13, wherein the trained model is a neural network that is trained with the one or more first sound sources, the one or more second sound sources, multiple sensing outputs and a training dataset, and wherein the training dataset is associated with a combination of clean single-microphone audio data and noisy single-microphone audio data originated from the one or more first sound sources and the one or more second sound sources.

* * * * *